3,078,213
COPPER-CONTAINING FUNGICIDES
Jean Louis Emile Pomot, Neuilly-sur-Seine, Emmanuel Jean Francois Luzarreta, Toulouse, and Robert Léon Pierre Becanne, Pinsaguel, France, assignors to Office National Industriel de l'Azote, Toulouse, Haute-Garonne, France, a French body corporate
Filed May 24, 1960, Ser. No. 31,411
Claims priority, application France May 29, 1959
17 Claims. (Cl. 167—33)

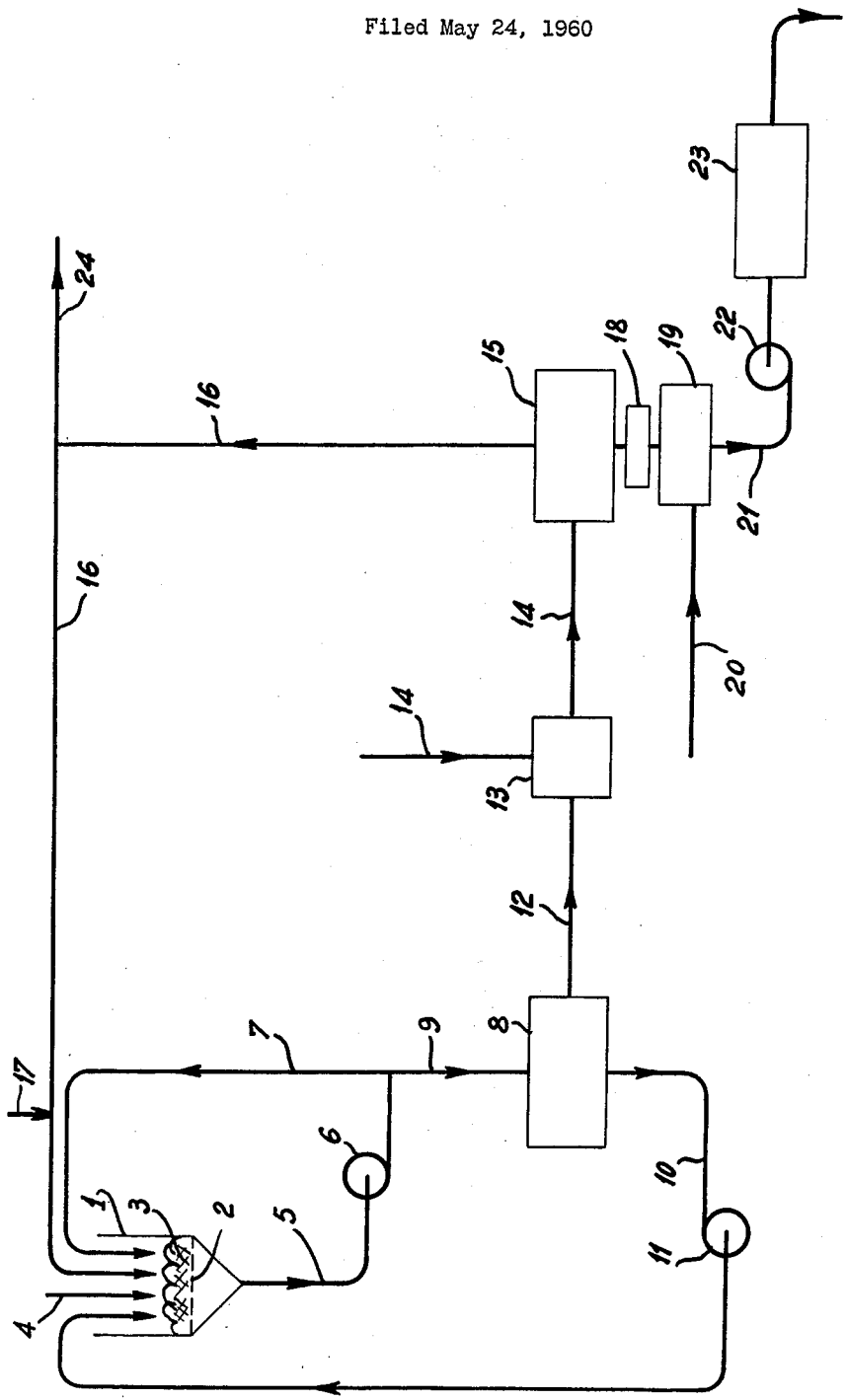

This invention relates to fungicides containing copper which are useful in agricultural practice.

Experience has shown that copper employed in the form of its salts to combat parasitic fungi in agriculture is more effective when employed in the form of complex copper-ammonia (cuprammonium) ions.

The salts of the cuproammonium ion which have been in the past proposed as fungicides have serious disadvantages, which have limited their use. These disadvantages arise out of the water-solubility of these salts, which gives them a degree of phytotoxicity which increases with increasing concentration of the solution employed, and also causes a lack of permanence of the fungicidal product deposited on the vegetative organs of plants.

No water-insoluble salt of cuproammonium ions which can be used as a spray or as a dust has hitherto been proposed for use on an industrial scale.

It is an object of the present invention to provide compositions containing the cuprammonium ion in an insoluble form which shall yet have good fungicidal properties. A further object is to provide a new and effective method of protecting plants against fungus attack. A still further object is to provide a continuous and simple process for the manufacture of cuprammonium cyanurate. Further objects will appear hereinafter.

It has now been found that the salt formed by the cuprammonium ion with cyanuric acid has excellent fungicidal properties against parasites which are normally amenable to treatment with cupric salts. More particularly this cuprammonium salt, which contains from 16% to 18% of copper calculated as metal has, weight for weight, an effectiveness comparable to or greater than that of mineral cupric salts whose copper content is about three times as high, for example copper oxychloride or basic copper sulphate.

The invention comprises therefore fungicidal compositions containing as an active ingredient cuprammonium cyanurate together with a liquid or solid diluent.

The invention includes also the production of cuprammonium cyanurate by effecting reaction between an aqueous solution of cyanuric acid and a water-soluble cuprammonium salt in ammoniacal aqueous solution. The cuprammonium salt may be pre-formed, but it is preferable to form it in situ by bringing an ammoniacal solution of cyanuric acid into contact with a solution of a water-soluble cupric salt. In either case the anion of the copper-containing salt is preferably derived from a strong mineral acid, being for example sulphate, chloride or nitrate.

As the cyanuric acid it is preferred to employ a crude product. It has been found that the presence of ammeline and ammelide in crude cyanuric acid does not affect the fungicidal power of cuprammonium cyanurate formed therefrom and it is to be presumed that at least one of these two accessory compounds also forms an active cuprammonium salt.

The crude cyanuric acid employed may be prepared by thermal treatment of urea and may contain variable proportions of ammelide and of ammeline. It may in addition contain without disadvantage urea and biuret, which remain in solution when the cuprammonium cyanurate formed is precipitated.

The cuprammonium salts of substantially pure and crude cyanuric acid take the form of mauve-coloured powders which are completely insoluble in water. The pH of suspensions thereof is in the neighbourhood of neutrality, i.e. between 7 and 8.

It is probable that the remarkable fungicidal activity of these salts is due to the association of the cuprammonium ion with the triazine nucleus.

A number of fungal diseases which can be effectively combatted in accordance with the invention by the application of the above-defined cuprammonium salts are enumerated by way of illustration but without limitation in the following table.

TABLE

| Plants: | Parasitic invasions |
|---|---|
| Walnut, red currant, black currant, raspberry | Anthracnose. |
| Peach | Exoascales. |
| Peach | Coryneum. |
| Quince | Entomosproia. |
| Cherry | Gnomonia. |
| Apricot, apple, peach, pear, plum | Monilia. |
| Pear, plum, red currant | Rust. |
| Quince | Sclerotinia. |
| Pear, raspberry | Septoria. |
| Pear, apples | Speckles. |
| Strawberry | Purple spot disease. |
| Strawberry | Mycospharella fragariae. |
| Strawberry | Fabraea cartiana. |
| Vine | Anthracnose, black rot, mildew, rot. |
| Hops | Mildew. |
| Potato | Mildew. |
| Beet | Cercospora, mildew. |
| Cereal seeds | Damping off (treatment of the seeds), wheat carries. |
| Rice | Parasitic algae of the seedlings. |
| Tomato | Alternaria. |
| Pea, French bean | Anthracnose. |
| Tomato | Cladosporia. |
| Tomato, cabbage, onion, spinach, leek | Mildew. |
| Melon | Leaf curl. |
| French bean, broad bean, chicory, asparagus | Rust. |
| Celery, tomato | Septoria. |
| Floral cultures | Damping off, Fusaria. |
| Pink | Heterosporia. |
| Pink, chrysanthemum | Rust. |

It has furthermore been found that the fungicidal agents of the present invention have a markedly favourable positive effect on the vegetation of the treated plants. More especially, in the treatment of vine against mildew (*Plasmopara viticola*), it is found that the foliage appears to be richer in chlorophyll and that falling of the leaves is retarded in the late season. Without wishing to be bound by any theory of this phenomenon, it may be assumed that the supply of organic and ammoniacal nitrogen, of which the cuprammonium salts under consideration contain from 25% to 30% by weight, is the cause of this increased strength of vegetation.

The cuprammonium cyanurate, more especially the mixtures obtained from crude cyanuric acid as described above, many be used according to the various methods known for combatting cryptogams. Thus, for example, the active substance or substances may be dispersed in water, preferably in the presence of adjuvants such as wetting agents, adhesives and dispersing agents, if necessary or desired simultaneously with known active substances (fungicides and/or insecticides) and the dispersion may be applied to the plants by spraying, sprinkling, etc. Aqueous suspensions may advantageously contain from 0.2% to 3% of cuprammonium cyanurate. The active substance or substances may also be applied to the plants as a powder or dust by known dusting methods, preferably in association with conventional adjuvants such as loading substances, adhesive, etc.

The compositions of the invention containing the cuprammonium cyanurate may be wet or dry compositions ready for use, or concentrated mixtures which must subsequently be diluted by a liquid or solid vehicle before being applied.

The invention comprises also as a further feature a process for the continuous production of the cuprammonium salt of crude cyanuric acid and of fungicidal compositions containing it. In this process, an aqueous solution of ammonia is brought into contact with lumps of cyanuric acid, whereafter any solid particles are separated from the resulting solution and returned into the contact zone, the liquid portion is passed through a turbulent zone fed with an aqueous solution of a water-soluble cupric salt, the resulting aqueous cupric cyanurate suspension is passed into a zone for the separation of the solid from at least part of the liquid, and the latter is returned to the contact zone. In the case of the direct production of a fungicidal composition, the solid may thereafter be mixed, again continuously, with the adjuvants required for the final composition, and the mixture formed may be dried.

This process will be illustrated by reference to the accompanying drawing, in which the single FIGURE shows diagrammatically a form of apparatus which can be employed.

Referring now to the drawing, disposed in a receptacle 1, of which the base is formed by a close-meshed metal cloth 2, is a bed 3 of crude cyanuric acid in lumps. A concentrated aqueous ammonia solution introduced through a pipe 4 is sprayed on the bed 3. The effluent which leaves the base of the receptacle 1 by way of the pipe 5 is passed through a pump 6, part being returned to the receptacle 1 by way of a pipe 7, and part being forwarded to a separator 8 by way of a pipe 9. In this separator, which may be a decanter or a centrifuge, fine particles of crude cyanuric acid which are entrained but not dissolved are separated, to be returned by way of a pipe 10 and a pump 11 to the receptacle 1, while the clear portion, which is an ammoniacal solution of crude cyanuric acid, is fed through a pipe 12 into a precipitation tank 13 which simultaneously and continuously receives through a pipe 14 an aqueous solution of a water-soluble cupric salt, for example cupric sulphate, cupric chloride or cupric nitrate.

The rate of flow of the cupric salt solution is adjusted in accordance with its concentration, on the one hand, and the triazine derivative concentration in the ammoniacal solution, on the other hand, so that preferably approximately stoichiometrical proportions of the two reactants are mixed together.

The precipitation tank 13 is provided with a mechanical stirring device and/or with an air bubbling device which sets up turbulence so as to maintain the precipitated cuprammonium cyanurate in homogeneous suspension. The effluent from the precipitation tank 13 contains in suspension the cuprammonium cyanurate and in solution the ammonium salt corresponding to the anion of the water-soluble cupric salt employed, as also the excess of ammonia and any soluble impurities from the crude cyanuric acid employed.

This effluent is directed through a pipe 14 to a static decanter 15, in which the cuprammonium salt is deposited in the form of a pulp.

The clear supernatant solution is continuously returned to the receptacle 1 through a pipe 16 after adjustment of its ammonia content to the desired level (pipe 17).

The pulp leaving the decanter 15 is passed through a rotary filter 18, in which it is washed with water before being directed to a mixer 19. The desired adjuvants, e.g. gum arabic or sodium lignosulphite, etc., are continuously introduced into the mixer 19 through a pipe 20. The concentrated liquid mixture is thereafter continuously passed through a pipe 21 and a pump 22 into a spray drier 23.

Generally speaking, the fineness of the particles so obtained is sufficient for fungicidal use and does not necessitate any subsequent crushing or micronisation.

If necessary, part of the ammonium salt solution may be continuously extracted at 24 for the purpose of recovering the ammonium sulphate, chloride or nitrate produced in the reaction.

The following example illustrates the production of cuprammonium cyanurate by a discontinuous procedure.

*Example*

By stirring 5 g. of cyanuric acid in 100 cc. of 0.46 N ammonia for 1 hour, 1.05 g. of cyanuric acid is caused to enter into solution. After decantation, the clear solution is treated with 11 cc. of an aqueous solution of copper sulphate containing 8.5 g. of $CuSO_4 5H_2O$ to 100 cc. There is thus obtained 1.372 g. of violet cuprammonium cyanurate containing 17% of copper.

The copper sulphate is entirely consumed.

The cyanuric acid is consumed to an extent of 90%.

This example may be adapted to the continuous production described with reference to the drawing, the volume of the receptacle 1 then being 10 litres and the rate of flow through the pipe 9 being 1 litre per hour of a solution of 1.05 g. of cyanuric acid in 100 cc. of 0.46 N ammonia.

It will of course be understood that purified cyanuric acid can if desired be used in place of the crude compound in the processes described above.

We claim:

1. A fungicidal composition containing as an active ingredient cuprammonium cyanurate together with a diluent.

2. A fungicidal composition according to claim 1, wherein the cuprammonium cyanurate has a copper content of 16–18% by weight.

3. A fungicidal composition according to claim 2, wherein the cuprammonium cyanurate is in the form of a dust containing also a loading agent in powder form.

4. A fungicidal composition according to claim 2, wherein the cuprammonium cyanurate is in suspension in water containing at least one adjuvant.

5. A fungicidal composition according to claim 4, wherein the water contains at least one compound selected from the group which consists of dispersing agents, wetting agents and adhesives.

6. A fungicidal composition according to claim 5, wherein the content of cuprammonium cyanurate is 0.2–3%.

7. Process for the treatment of plants for the purpose of protecting them from fungus attack, which comprises applying to the above-ground parts of the plant a composition in claim 1.

8. Process for the treatment of plants for the purpose of protecting them from fungus attack, which comprises applying to the above-ground parts of the plant a composition claimed in claim 2.

9. Process for the treatment of plants for the purpose of protecting them from fungus attack, which comprises applying to the above-ground parts of the plant a composition claimed in claim 3.

10. Process for the treatment of plants for the purpose of protecting them from fungus attack, which comprises applying to the above-ground parts of the plant a composition claimed in claim 4.

11. Process for the treatment of plants for the purpose of protecting them from fungus attack, which comprises applying to the above-ground parts of the plant a composition claimed in claim 5.

12. Process for the treatment of plants for the purpose of protecting them from fungus attack, which comprises applying to the above-ground parts of the plant a composition claimed in claim 6.

13. Process for the production of a cuprammonium cyanurate, which comprises mixing an aqueous solution of a cupric salt selected from the group consisting of cupric sulphate, cupric chloride and cupric nitrate with an aqueous ammoniacal solution of cyanuric acid.

14. Process for the production of a cuprammonium cyanurate, which comprises continuously bringing an aqueous solution of ammonia into contact with cyanuric acid in lump form, continuously removing the solution of ammonium cyanurate so formed, separating any entrained particles of cyanuric acid and returning them to the vessel containing the said cyanuric acid in lump form, mixing the resulting clear liquid under turbulent conditions with an aqueous solution of a water-soluble cupric salt selected from the group consisting of cupric sulphate, cupric chloride and cupric nitrate, treating the resulting aqueous suspension of cuprammonium cyanurate to separate at least part of its liquid content therefrom, and recycling at least part of the separated liquid to the vessel containing the said cyanuric acid in lump form.

15. Process according to claim 14, wherein the cyanuric acid is the crude product obtained by heating urea.

16. Process according to claim 14, comprising also the further step of continuously mixing the residue with at least one adjuvant to form a fungicidal composition.

17. Process for the production of cuprammonium cyanurate, which comprises mixing an aqueous solution of cyanuric acid with an ammoniacal aqueous solution of a cuprammonium salt selected from the group consisting of cuprammonium sulphate, cuprammonium chloride and cuprammonium nitrate.

References Cited in the file of this patent
UNITED STATES PATENTS
2,101,704    Dangelmajer _____ Dec. 7, 1937
OTHER REFERENCES Frear: Chemistry of Insecticides, Fungicides and Herbicides, 2nd ed., 1948, pp. 218, 219.